(12) United States Patent
Adderly et al.

(10) Patent No.: US 9,792,738 B1
(45) Date of Patent: *Oct. 17, 2017

(54) ON-ROAD VEHICLE SERVICE HANDLING METHOD

(71) Applicant: International Business Machines Corporation, Armonk, NY (US)

(72) Inventors: Darryl M. Adderly, Morrisville, NC (US); Jonathan W. Jackson, Durham, NC (US); Ajit Jariwala, Cary, NC (US); Eric B. Libow, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/211,412

(22) Filed: Jul. 15, 2016

Related U.S. Application Data

(63) Continuation of application No. 15/140,708, filed on Apr. 28, 2016, now Pat. No. 9,471,903.

(51) Int. Cl.
*G01C 21/26* (2006.01)
*G07C 5/00* (2006.01)
(Continued)

(52) U.S. Cl.
CPC .......... *G07C 5/008* (2013.01); *G01C 21/3605* (2013.01); *G06Q 10/02* (2013.01); *G07C 5/0808* (2013.01)

(58) Field of Classification Search
CPC ........ G06Q 10/20; G06Q 10/02; G07C 5/006; G07C 5/008; B60R 16/0234
See application file for complete search history.

(56) References Cited

U.S. PATENT DOCUMENTS 6,553,292 B2     4/2003     Kokes et al.
6,732,028 B2     5/2004     Vanstory et al.
(Continued)

OTHER PUBLICATIONS

Hyundai Motor America, "Hyundai Launches Online Service Scheduling Program—Automated Service Connection and Assurance Solution," PRNewswire, Jul. 21, 2015.

*Primary Examiner* — Thomas G Black
*Assistant Examiner* — Peter D Nolan
(74) *Attorney, Agent, or Firm* — Weitzman Law Offices, LLC

(57) ABSTRACT

A computerized, on-road, vehicle service handling method involves, while a user is driving a vehicle between first and second locations, receiving a fault condition signal from an on-board diagnostic system; automatically transmitting information to multiple vehicle service locations ahead of the vehicle, including vehicle and fault information and an individual estimated time of arrival (ETA) based upon current location and speed; receiving individual service responses including at least a parts and labor cost estimate, and at least one appointment time after the ETA; receiving a selection by the user of at least two of the provided vehicle service locations and an order of preference thereof; sending payment information to the first vehicle service location; receiving a communication either accepting or rejecting, and, if accepted, automatically directing the user to the first vehicle service location, but if rejected, sending the payment information to a next preferred vehicle service location.

1 Claim, 4 Drawing Sheets

(51) Int. Cl.
*G07C 5/08* (2006.01)
*G01C 21/36* (2006.01)
*G06Q 10/02* (2012.01)

(56) References Cited

U.S. PATENT DOCUMENTS

| | | |
|---|---|---|
| 6,823,258 B2 | 11/2004 | Ukai et al. |
| 8,417,412 B2 | 4/2013 | Tominaga et al. |
| 8,849,689 B1 | 9/2014 | Jagannathan et al. |
| 8,886,389 B2 | 11/2014 | Edwards et al. |
| 9,177,474 B2 | 11/2015 | Gellatly et al. |
| 2002/0004694 A1 | 1/2002 | Mcleod et al. |
| 2002/0111727 A1 | 8/2002 | Vanstory et al. |
| 2002/0111844 A1 | 8/2002 | Vanstory et al. |
| 2003/0036832 A1 | 2/2003 | Kokes et al. |
| 2005/0187834 A1 | 8/2005 | Painter et al. |
| 2009/0106036 A1 | 4/2009 | Tamura et al. |
| 2010/0324777 A1 | 12/2010 | Tominaga et al. |
| 2011/0224864 A1 | 9/2011 | Gellatly et al. |
| 2012/0078509 A1* | 3/2012 | Choi ............... G01C 21/3461 701/423 |
| 2013/0046432 A1 | 2/2013 | Edwards et al. |
| 2014/0088866 A1 | 3/2014 | Knapp et al. |
| 2014/0324275 A1 | 10/2014 | Stanek et al. |
| 2015/0066781 A1 | 3/2015 | Johnson et al. |
| 2015/0100199 A1 | 4/2015 | Kurnik et al. |

\* cited by examiner

FIG. 2A

| Location | Appt. Time | Estimated Cost |
|---|---|---|
| Joe's Service Station | 2p | Labor :$385 Parts: $150 |
| Supreme Auto Center | 1p | Labor $500 Parts $125 |
| Repair Barn | 3:30p | Labor $300 Parts $130 |
| Quad State Packard | 1p | Labor $400 Parts $130 |

Select 1st Choice  [END]

FIG. 2B

| Location | Appt. Time | Estimated Cost |
|---|---|---|
| Joe's Service Station | 2p | Labor :$385 Parts: $150 |
| Supreme Auto Center | 1p | Labor $500 Parts $125 |
| Repair Barn | 3:30p | Labor $300 Parts $130 |
| Quad State Packard | 1p | Labor $400 Parts $130 |

Select 2nd Choice  [END]

FIG. 2C

| Location | Appt. Time | Estimated Cost |
|---|---|---|
| Joe's Service Station | 2p | Labor :$385 Parts: $150 |
| Supreme Auto Center | 1p | Labor $500 Parts $125 |
| Repair Barn | 3:30p | Labor $300 Parts $130 |
| Quad State Packard | 1p | Labor $400 Parts $130 |

Select 3rd Choice  [END]

ON-ROAD VEHICLE SERVICE HANDLING METHOD

This application is a continuation of U.S. patent application Ser. No. 14/140,708, the entirety of which is incorporated herein by reference.

FIELD OF THE INVENTION

This disclosure relates generally to automobiles and, more particularly, obtaining service for a fault occurring in part of an automobile.

BACKGROUND

It is now routine for vehicles to automatically display warnings for scheduled maintenance like oil changes or other manufacturer recommended routine adjustments by presenting a "Service Required" indicator after a certain amount of time has elapsed or mileage has been driven. Likewise, for vehicles with on-board communication capability, dealers can provide similar reminders to the driver.

In some cases, manufacturers have suggested incorporating, or incorporated, certain capability into their vehicles such that, when a problem or fault is detected by a vehicle, the vehicle can automatically contact the dealer to assist the owner in scheduling service.

However, in some cases, the owner may prefer to not use a dealer for service due to, for example, the cost of the dealer service versus other service providers, parts availability and/or the convenience (in terms of dealer location or available appointment(s)). This may particularly be true when the owner is not in the vehicle and/or while it is being driven far from home, for example, during a vacation or other trip, especially when a fault arises that does not disable the vehicle but, nevertheless, requires prompt action.

SUMMARY

We have devised a technological solution in the form of a system that overcomes the foregoing shortcomings because, when a fault arises that does not disable the vehicle but, nevertheless, requires prompt action, it allows the driver to decide who will perform the service, based upon the cost of the dealer service versus other service providers, parts availability and/or the convenience (in terms of dealer location or available appointment(s)) while ensuring prompt action by such service provider, even if the owner is not in the vehicle and/or the vehicle is being driven far from home.

Moreover, our solution seeks to ensure that deviations from the trip route do not result in substantial loss of time due to backtracking by taking into account the intended route when identifying potential service providers.

One aspect of this disclosure involves a computerized, on-road, vehicle service handling method. The method involves I) while a user is driving a vehicle traveling between a first location and a second location, receiving a fault condition signal from an on-board diagnostic system, at a processor within the vehicle, indicating that service is urgently required for a part of the vehicle; II) while the vehicle is continuing to travel, automatically transmitting information to computer systems of multiple vehicle service locations in a direction ahead of the vehicle, taking into account location, speed and direction of travel towards the second location, the information including vehicle and fault information and an individual estimated time of arrival at the respective multiple vehicle service locations based upon current location and speed; III) receiving at the processor, from the computer systems of at least a few of the vehicle service locations, individual service responses including at least a cost estimate for parts and labor, and at least one appointment time within a specified time after the estimated time of arrival during which servicing can be performed; IV) using the processor, causing at least the vehicle service location, the cost estimate and at least one appointment time, from each of the received individual service responses to be provided to the user for potential selection; V) receiving, at the processor, a selection by the user of at least two of the provided vehicle service locations and an order of preference thereof; VI) replying to a first of the vehicle service locations in the order of preference, as a first service request, by sending payment information, retrieved from non-transient storage in the vehicle, to the computer system of the first of the vehicle service locations; VII) receiving a communication from the first of the vehicle service locations either accepting or rejecting the first service request, and VIII) if the communication is that first service request was accepted, automatically directing the user, using a GPS navigation system, from the current location to the first of the vehicle service locations, but if the communication is that the first service request was rejected, sending the payment information to a next preferred vehicle service location as a next service request.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which:

FIGS. 2A-2C illustrate, a simplified example of a display in a vehicle on which example information from service location responses for the fault situation are displayed.

DETAILED DESCRIPTION

This disclosure provides a technical solution in terms of an improvement to the automotive diagnostic and servicing field and that also specifically improves upon the function and operation of vehicles, vehicle on-board diagnostic systems and vehicle navigation systems. Moreover, our solution does so in an unconventional way that is neither a conventional nor routine solution employed in the automotive diagnostic and servicing field. Still further, our solution solves a specific problem arising only in the automotive diagnostic and servicing art.

Figure 1:
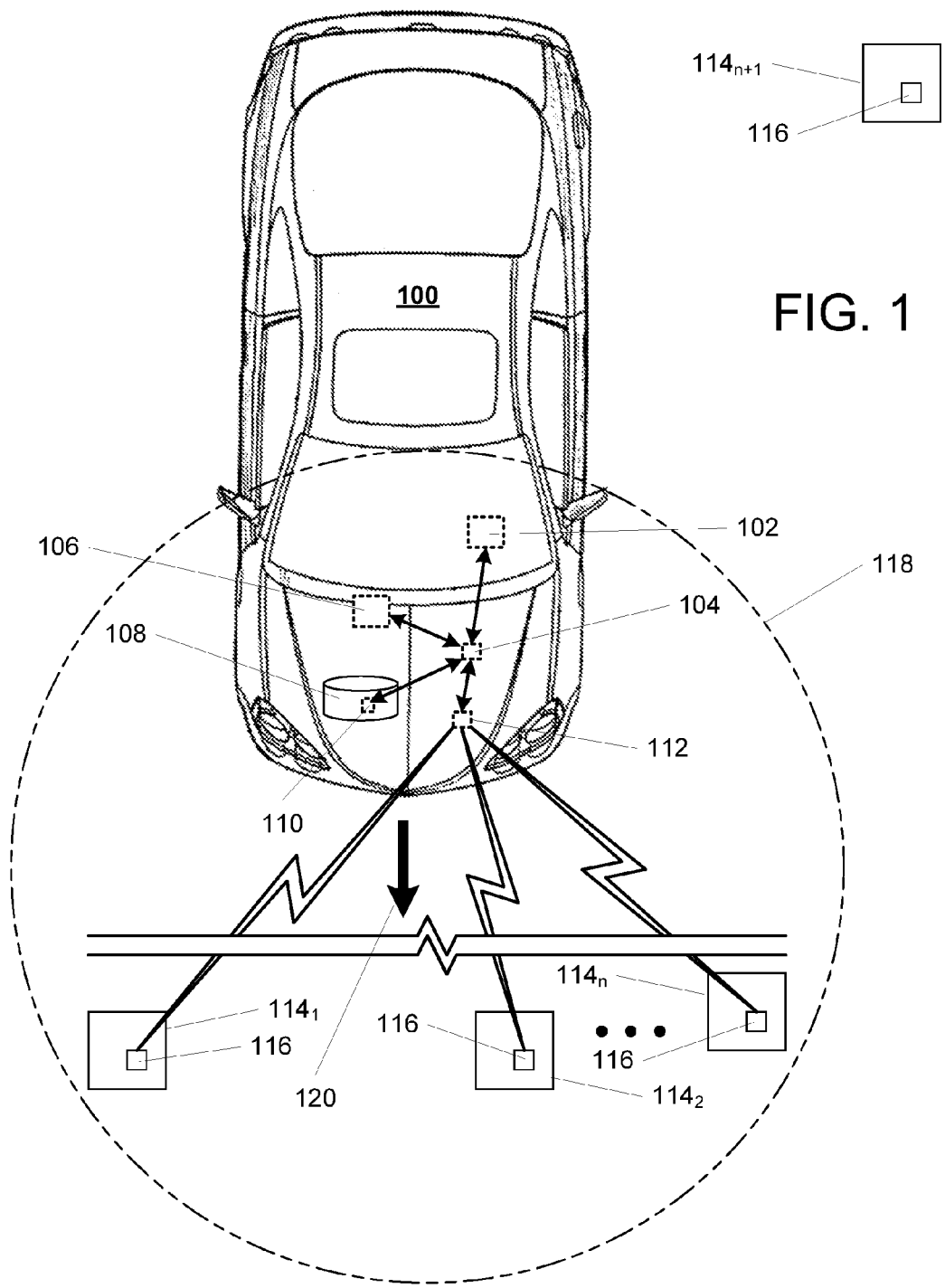
FIG. 1 illustrates, in simplified form, an overview of the components of a system that performs the on-road vehicle service handling method described herein.

FIG. 1 illustrates, in simplified form, an overview of the components involved in performing the on-road vehicle service handling method described herein.

The components are made up of one or more vehicle(s) 100 equipped with a global positioning system (GPS) navigation system 102 that provides directions for driving between two locations, one or more processor(s) 104 that interact with the GPS navigation system 102 and, among other systems, for example, an on-board diagnostic (OBD) system 106 in the vehicle 100 (generally manufacturer supplied) to provide self-diagnostics and real-time reporting of vehicle-related data and faults, using a standardized series of diagnostic trouble codes (DTCs)) over a standardized digital communications port. The processor(s) 104 is also connected to non-transitory storage 108. The storage 108 stores program instructions that can be retrieved and executed by the processor(s) 104, as well as data, in a non-transitory manner, for example, such as non-transient solid state memory, a magnetic hard drive, a CD or DVD, a tape drive, or an analogous or equivalent storage medium type would. Among the data that will be contained in the storage 108 is payment information 110 that can be input or changed by the owner or driver of the vehicle. During processes as described herein, payment information 110 will be sent via a communication system 112 in the vehicle 100, typically cellular data, in vehicle Wi-Fi, mobile satellite internet, etc., to one or more vehicle service locations 114 as described herein.

The payment information 110 will be whatever information is needed to effect payment to a vehicle service location 114 for vehicle service. For example, in the case of a credit/debit/charge card, it would likely at least be the credit card number, expiration date and Card Verification Value ("CVV"/"CVV2") number (also sometimes known as a Card Security Code ("CSC") number, but may alternatively leverage other payment systems including electronic funds transfer ("EFT"), indirect payment systems like PayPal®, Venmo, cellular phone/device payment methods (e.g., Apple Pay, Android Pay, Samsung Pay), etc. The important aspect being the ability of the service location 114 to accept and process the payment information 110 it receives from a vehicle 100 at the service location's computer system 116.

With an understanding of the various components involved in our on-road vehicle handling method, the method itself will now be described firs by way of an example, for ease of understanding, and then with reference to the flowchart of FIGS. 3A-3B.

At the outset, the method is performed while the vehicle is being driven and, since it employs use of the GPS navigation system 102, that system must be present and operating, even if the driver is not using it to actually direct them to a location, although our method is much more useful if the GPS system 102 is being used to direct the driver because the intended end location and expected direction and path of travel as will then be known. At this point, it should be noted that the GPS navigation system 102 is intended to encompass such systems that are integrated with the vehicle during manufacture, as a dealer-installed option, systems purchase-able from third party providers and application programs ("Apps") installed on smart phones, smart watches, and other such portable devices provided the OBD system 106 and GPS system 102 are communicatively connected, for example using Bluetooth® or other short range data communication protocol. For purposes of this example, presume that the driver has programmed a destination into the GPS system 102 and is proceeding towards the programmed destination location as directed by the GPS system 102.

Also presume that some fault has been detected by the OBD system 106 that requires prompt attention but does not cause the vehicle 100 to stop operating, for example, a malfunction with one of the vehicle's fuel injectors.

The process begins when the processor(s) 104 receives the fault condition signal from the on-board diagnostic system 106. When that happens, the processor(s) 104 interacts with the GPS navigation system 102, to cause it to automatically identify multiple vehicle service locations 114 that are within a limited distance radius 118 of the directional path 120 towards the destination location, based upon the then-current location of the vehicle 100 on the path 120. In other words, "within a limited distance radius 118 of the directional path 120 towards the destination location" means that, as the vehicle 100 is traveling, the GPS navigation system 102 will attempt to identify multiple vehicle service locations 114 that are ahead of the vehicle 100 and do not cause the vehicle 100 to have to deviate from the path more than a certain specified distance, which may, depending upon the implementation, be automatically specified or may be set by the owner/driver of the vehicle. Thus, at this point it should be understood that the term "radius" is not intended to be limited to a strict mathematical definition, but rather a range of distance from the vehicle 100 generally in the direction of travel taking into account the speed of travel according to the GPS directions so as to avoid "backtracking" if possible. Thus, if the vehicle is traveling along local roads, the radius would likely be much smaller than if the vehicle is traveling on a highway at 60 miles per hour. Otherwise, by the time arrangements are made, as described below, the vehicle 100 could be past one or more of the identified service locations 114 and have to backtrack.

In general, the individual service locations 114 will be members of a network of service locations configured to interact with vehicles in the manner described herein. This can be accomplished, on the service location side, by, for example, a subscription service, through an automobile association (e.g., the American Automobile Association, National Automobile Club, etc.) or insurance company affiliate program, etc.

Once multiple vehicle service locations 114 are identified, while the vehicle is continuing to travel, the processor 104 will automatically transmit certain information to the computer system(s) 116 of each of the identified multiple vehicle service locations. The information that is transmitted will at least identify, directly or indirectly (for example, based upon the Vehicle Identification Number (VIN)): the make, model, and year of the vehicle, the detected fault condition (in terms of a fault code or some other identifier) that was represented by the fault condition signal, along with, for each of the identified multiple vehicle service locations, a respective estimated time of arrival at the respective vehicle service locations, based upon the current vehicle location and its speed of travel.

Thus, as shown in FIG. 1, specific service locations $114_1$, $114_2$, $114_n$ were identified because they are sufficiently ahead of the vehicle 100 along the path 120 of the GPS-specified route, taking into account the vehicle's speed but another service location $114_{n+1}$ was not identified because the vehicle 100 has already passed it.

Upon receipt of such information, the individual service locations 114 will determine whether they can handle the problem, in terms of having the parts on hand and/or expertise/capability and can do so at, or within a reasonable time after (e.g., less than one hour) the estimated time of arrival. If a service location 114 can meet these requirements, the service location 114 will send back a service response to the vehicle 100 via its computer system 116.

On the vehicle 100 side, the vehicle 100 will receive the individual service responses from at least a few of the vehicle service locations 114, with each of the individual service responses: a) reflecting an ability of that service location 114 to service the vehicle 100 based upon the fault condition, b) inherently representing to the vehicle operator that service location 114 has a present stock of any parts needed to provide the service, c) including at least an estimate of a cost of parts and labor to service the part of the vehicle on an urgent basis, and d) including at least one appointment time within a specified time after the estimated time of arrival during which the servicing of the part of the vehicle can be performed.

Upon receipt of the service responses, the processor(s) 104 will then cause at least the estimate and at least one appointment time from each of the individual service responses to be provided within the vehicle to a user for potential selection. This is shown in FIGS. 2A-2B.

FIGS. 2A-2C illustrate, a simplified example of a display 200 in the vehicle 100 on which service location responses for this fault situation example are displayed. Depending upon the particular implementation, the responses can be displayed in an auxiliary display in the vehicle, in part of a digital dashboard display (if the vehicle is so equipped), in the GPS system 102 display, or elsewhere.

As shown in FIGS. 2A-2C, four individual service locations 114 have provided responses. In the display 200, the user is then prompted 202 to select from among the displayed service locations 114 in order of preference. This allows the user to balance cost and time and/or select a preferred service location over one or more others. As shown in FIG. 2A, the user has initially selected "Quad State Packard" 204 as their first choice, as indicated by the darkened border 206 around it in the display 200. As shown in FIG. 2B, the user then selected "Repair Barn" 208 as their second choice. As shown in FIG. 2C, the user selected "Joe's Service Station" 210 as their third choice and then selected "END" 212 to indicate that they do not wish to make any more selections.

Optionally, as shown in FIGS. 2A-2C, the display 200 can also provide the ability to sort the responses, for example, by location 214, appointment time 216 and/or cost estimate 218 by selecting the appropriate labeled header. Likewise, the display 200 can include a scrolling feature 220 whereby, in the event that all of the responses cannot concurrently all fit in the display 200.

The processor 104 receives the selection(s) by the user of at least two of the vehicle service locations 204, 208, 210 and their order of preference, and, in response to the selection, automatically accesses the non-transient storage 108 within the vehicle 100 and retrieves the payment information 110 stored therein.

Next, the processor 104 replies to the first vehicle service location in the ordered preference list, in this case Quad State Packard, by sending the retrieved payment information 110 to the Quad State Packard computer system 116.

Notably, the sending of the payment information 110 assures the service location 114 that the vehicle 100 is coming and induces the service location to ensure that the appointment slot is reserved for that vehicle 100. Likewise, the acceptance of the payment information assures the user that the service location can, and will, provide the needed service at essentially the time promised (e.g., allowing for common delays/early completion). Alternatively, the failure of a service location 114 to receive payment information 110 within some window of time can be interpreted as an implied intent to use some other service location 114.

Now it should be understood that, in some cases, between the time a service location sends their response and the time the payment information 110 is received, a service location 114 may no longer be able to service the vehicle 100, for example, because the necessary part(s) get used or the appointment slot becomes unavailable. Likewise, it is possible that the payment information 110 may be declined for some reason. As a result, despite receiving the payment information 110 the service location will be required to communicate an acceptance or rejection of the service request.

Thus, the processor will receive a communication from the first vehicle service location in the preference list, in this case Quad State Packard either accepting or rejecting the service request.

If Quad State Packard accepted the service request, the processor 104 will automatically update the GPS navigation system 102 (depending upon the implementation and GPS navigation system 102), either as an intermediate stop or a new destination, from the then-current location of the vehicle 100 to that vehicle service location 114 (e.g., Quad State Packard) and thereby direct the vehicle to that service location.

Alternatively, if Quad State Packard rejected the service request, the processor will reply to the next vehicle service location 114 in the ordered list, in this example, Repair Barn, by sending the retrieved payment information 110 to Repair Barn's computer system 116.

Again, Repair Barn will accept or reject the service request and, if Repair Barn accepts, the processor 104 will automatically update the GPS navigation system 102 to direct the vehicle to Repair Barn, and if Repair Barn rejects, the processor 104 will repeat the process for the next service location 114 in the list, and so forth until all selected service locations 114 have been exhausted.

In the case where all of the service locations 114 that a user has selected have rejected the service requests, advantageously, since the vehicle has been proceeding, via the GPS directions, towards its destination, new service locations 114 will likely now be in range and the process can repeat, while eliminating any service locations that come up again but already rejected the service request.

Figure 3A:
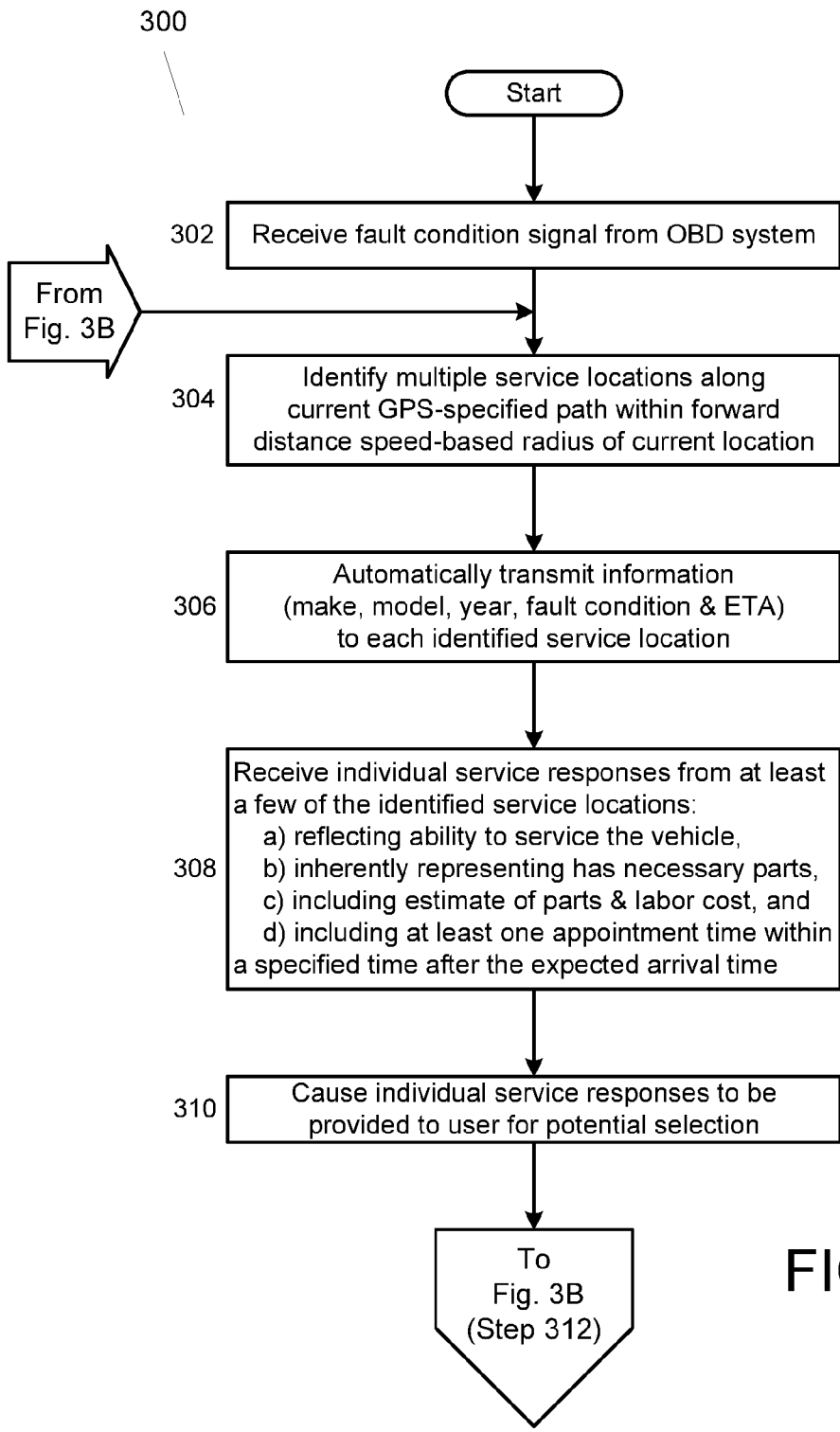
FIGS. 3A-3B illustrate, a simplified flow chart of one example of our computerized on-road vehicle service handling process as described herein.
Figure 3B:
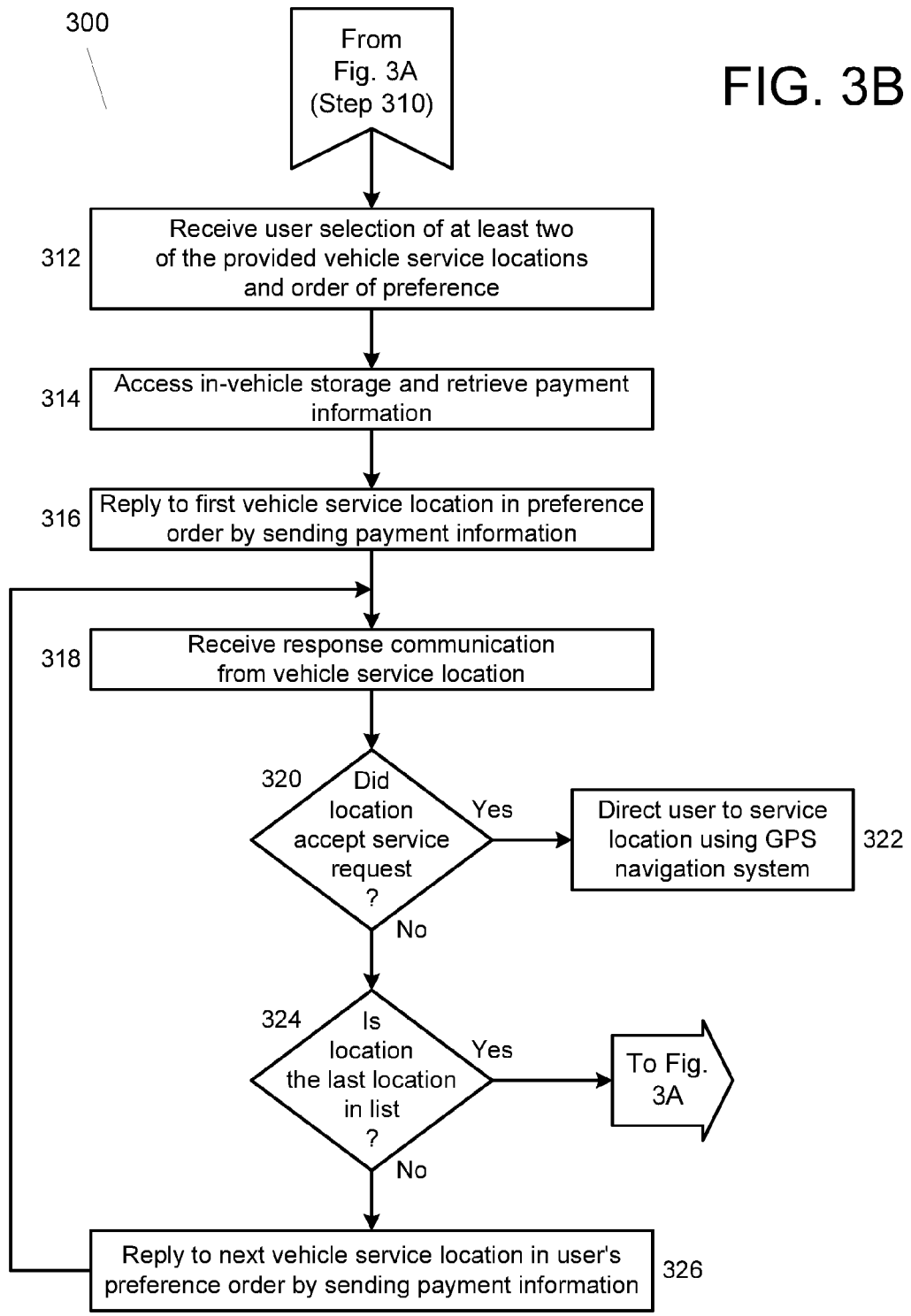

FIGS. 3A-3B illustrate, a simplified flow chart 300 of one example of our computerized on-road vehicle service handling process as described herein.

The process begins with receipt of a fault condition signal from the OBD system (Step 302).

In response to that receipt, multiple service locations along the current GPS-specified directional path within a distance radius, along the forward travel path, of the vehicle will be identified, taking into account the speed of the vehicle (Step 304).

Once multiple service locations have been identified, and while the vehicle continues to travel along the GPS-specified route, information identifying at least: the make, model, and year, of the vehicle, fault condition represented by the fault condition signal, and an individualized estimated time of arrival at the respective vehicle service locations (based upon the current location and speed of travel) is transmitted to those vehicle service locations (Step 306).

In response, individual service responses will be received from the computer systems of at least a few of the vehicle service locations with the individual service responses a) reflecting an ability of the respective service location to service the vehicle based upon the fault condition, b) inherently representing that the service location has a present stock of any parts needed to provide the service, c) including at least an estimate of a cost of parts and labor to service the part of the vehicle on an urgent basis, and d) including at least one appointment time within a specified time after the estimated time of arrival during which the servicing of the part of the vehicle can be performed (Step 308).

Next, causing at least the estimate and at least one appointment time from each of the individual service responses to be provided to the user for potential selection (Step 310).

The user will then select at least two of the vehicle service locations and specify an order of preference among them (Step 312).

In response to the selection, non-transient storage within the vehicle will automatically be accessed and payment information stored therein will be retrieved (Step 314).

Then a first service request will be sent as a reply to the first vehicle service location in the ordered list by sending the retrieved payment information to the first vehicle service location in the order (Step 316).

Thereafter, a response communication will be received from the vehicle service location either accepting or rejecting the service request (Step 318).

If the service request was accepted (Step 320), the user will be directed, using the GPS navigation system, from their current location to the vehicle service location (Step 322).

If the service request was rejected (Step 320), the process checks to determine whether that service location was the last service location in user's preference list (Step 324). If it was not the last in the list, the process will replying to the next vehicle service location in the ordered list by sending the retrieved payment information to it (Step 326) and loop back to Step 318.

If, however, at Step 324 the vehicle service location is the last in the preference list, the process will again, taking into account the speed of the vehicle and GPS-specified directional path, identify multiple service locations within a distance radius, along that forward travel path as before (Step 304).

Thus, it should now be appreciated that implementations of our invention represent an improvement to the automotive diagnostic and servicing field because it allows a user to arrange for vehicle service and have it performed promptly while in mid-trip instead of delaying, which could result in worse or further damage to the vehicle. In addition, it ensures that the vehicle service will be performed at a time of the user's preference while guaranteeing payment for the vehicle's servicing.

Likewise, implementations of our invention improve upon the function and operation of vehicles, vehicle on-board diagnostic systems and vehicle navigation systems because it causes them to interoperate in a way that is unconventional and was not previously been done in the automotive diagnostic and servicing field to provide for more prompt addressing of a fault in the vehicle in a way that can be much more convenient and reduce the prospect of a worsening situation.

Finally, the automotive diagnostic and servicing art is an art with unique problems and our system and approach are uniquely targeted to a specific unique problem within that art.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A computerized, on-road, vehicle service handling method comprising:
   I) while a user is driving a vehicle traveling between a first location and a second location, receiving a fault condition signal from an on-board diagnostic system, at a processor within the vehicle, indicating that service is urgently required for a part of the vehicle;
   II) while the vehicle is continuing to travel, automatically transmitting information to computer systems of multiple vehicle service locations in a direction ahead of the vehicle, taking into account location, speed and direction of travel towards the second location, the information including vehicle and fault information and an individual estimated time of arrival at the respective multiple vehicle service locations based upon current location and speed;
   III) receiving at the processor, from the computer systems of at least a few of the vehicle service locations, individual service responses including at least a cost estimate for parts and labor, and at least one appointment time within a specified time after the estimated time of arrival during which servicing can be performed;
   IV) using the processor, causing at least the vehicle service location, the cost estimate and at least one appointment time, from each of the received individual service responses to be provided to the user for potential selection;
   V) receiving, at the processor, a selection by the user of at least two of the provided vehicle service locations and an order of preference thereof;
   VI) replying to a first of the vehicle service locations in the order of preference, as a first service request, by sending payment information, retrieved from non-transient storage in the vehicle, to the computer system of the first of the vehicle service locations;
   VII) receiving a communication from the first of the vehicle service locations either accepting or rejecting the first service request, and
   VIII) if the communication is that first service request was accepted, automatically directing the user, using a GPS navigation system, from the current location to the first of the vehicle service locations, but if the communication is that the first service request was rejected, sending the payment information to a next preferred vehicle service location as a next service request.

* * * * *